United States Patent
Nyhuis (10) Patent No.: US 10,494,279 B2
(45) Date of Patent: Dec. 3, 2019

(54) METHOD FOR BIOLOGICAL CLEANING OF WASTEWATER

(71) Applicant: EssDe GmbH, Gommiswald (CH)

(72) Inventor: Geert Nyhuis, Gommiswald (CH)

(73) Assignee: ESSDE GMBH, Gommiswald (CH)

( * ) Notice: Subject to any disclaimer, the term of this patent is extended or adjusted under 35 U.S.C. 154(b) by 62 days.

(21) Appl. No.: 15/579,605

(22) PCT Filed: May 20, 2016

(86) PCT No.: PCT/EP2016/061397
§ 371 (c)(1),
(2) Date: Dec. 5, 2017

(87) PCT Pub. No.: WO2016/198252
PCT Pub. Date: Dec. 15, 2016

(65) Prior Publication Data
US 2018/0141840 A1  May 24, 2018

(30) Foreign Application Priority Data

Jun. 9, 2015 (EP) ..................................... 15401058

(51) Int. Cl.
*C02F 3/08* (2006.01)
*C02F 1/38* (2006.01)
(Continued)

(52) U.S. Cl.
CPC .............. *C02F 3/085* (2013.01); *C02F 1/38* (2013.01); *C02F 3/105* (2013.01); *C02F 3/1205* (2013.01);
(Continued)

(58) Field of Classification Search
CPC .......... C02F 1/52; C02F 2305/12; C02F 1/38; C02F 1/385; C02F 2001/007;
(Continued)

(56) References Cited

U.S. PATENT DOCUMENTS

| 5,643,453 A | 7/1997 | Pannier et al. |
| 9,242,882 B2 | 1/2016 | Nyhuis et al. |

(Continued)

FOREIGN PATENT DOCUMENTS

| DE | 20202371 U1 | 6/2002 |
| EP | 0685433 A1 | 12/1995 |

(Continued)

OTHER PUBLICATIONS

Terry Johnson, et al., "Integrated Fixed-film Activated Sludge (IFAS): The New Choice for Nitrogen Removal Upgrades in the United States", Research Gate, Jan. 2004, pp. 1-24.

(Continued)

*Primary Examiner* — Claire A Norris
(74) *Attorney, Agent, or Firm* — Leydig, Voit & Mayer, Ltd.

(57) ABSTRACT

In an embodiment, the present invention provides a method for the biological cleaning of wastewater in an activated-sludge plant including at least one activated-sludge tank, the method including: contacting, in the plant, the wastewater with activated sludge in the activated-sludge tank so as to clean the wastewater; and after the cleaning of the wastewater, separating, in the plant, the suspended activated sludge from the cleaned wastewater by sedimentation in a secondary clarification tank downstream of the activated-sludge tank or in the activated-sludge tank. The activated sludge suspended in the wastewater is admixed with growth bodies in the activated-sludge tank in order to contact the growth bodies with the microorganisms present in the activated sludge and to bring about formation of a biofilm of microorganisms on the growth bodies.

18 Claims, 3 Drawing Sheets

(51) Int. Cl.
*C02F 3/12* (2006.01)
*C02F 3/00* (2006.01)
*C02F 3/10* (2006.01)

(52) U.S. Cl.
CPC ...... *C02F 3/1263* (2013.01); *C02F 2003/001* (2013.01); *C02F 2303/24* (2013.01); *Y02W 10/15* (2015.05)

(58) Field of Classification Search
CPC .. C02F 2301/046; C02F 3/12; C02F 2303/16; C02F 3/085; B01D 21/267; B01D 21/00; B01D 21/262
USPC .................................. 210/616, 713, 665, 787
See application file for complete search history.

(56) References Cited

U.S. PATENT DOCUMENTS

| 2004/0206699 | A1 | 10/2004 | Ho et al. |
| 2011/0147304 | A1 | 6/2011 | Sauvignet |
| 2014/0144836 | A1 | 5/2014 | Nyhuis et al. |
| 2015/0336827 | A1* | 11/2015 | Boltz ........................ C02F 3/30 210/610 |
| 2018/0141840 | A1 | 5/2018 | Nyhuis |

FOREIGN PATENT DOCUMENTS

| EP | 2022763 | A1 | 2/2009 |
| EP | 2039659 | A1 | 3/2009 |
| EP | 2925676 | A1 | 10/2015 |
| EP | 3307682 | A1 | 4/2018 |
| GB | 2032904 | A | 5/1980 |
| JP | 60122095 | A | 6/1985 |
| WO | WO 9803433 | A1 | 1/1998 |
| WO | WO 2014085662 | A1 | 6/2014 |

OTHER PUBLICATIONS

F. Clauss, et al., "Improving activated sludge floc structure and aggregation for enhanced settling and thickening performances", Water Science and Technology, vol. 38, issues 8-9, Dec. 1998, pp. 35-44.

C. Nicolella, et al., "Wastewater treatment with particulate biofilm reactors", Journal of Biotechnology, Elsevier Science Publisher, Amsterdam, NL, vol. 80, nr. 1, Jun. 1, 2000, pp. 1-13, XP004201975.

* cited by examiner

METHOD FOR BIOLOGICAL CLEANING OF WASTEWATER

CROSS-REFERENCE TO PRIOR APPLICATIONS

This application is a U.S. National Phase application under 35 U.S.C. § 371 of International Application No. PCT/EP2016/061397, filed on May 20, 2016, and claims benefit to European Patent Application No. EP 15401058.1, filed on Jun. 9, 2015. The International Application was published in German on Dec. 15, 2016 as WO 2016/198252 under PCT Article 21(2).

FIELD

The invention relates to a method for the biological cleaning of wastewater in an activated-sludge plant comprising at least one activated-sludge tank, in which plant the wastewater is contacted with activated sludge in the activated-sludge tank and cleaned and in which plant the suspended activated sludge is, after the cleaning of the wastewater, separated from the cleaned wastewater by sedimentation in a secondary clarification tank downstream of the activated-sludge tank (conventional activated-sludge plant) or in the activated-sludge tank (SBR plant).

BACKGROUND

Apart from admixtures of grit, communal and industrial wastewaters contain coarse, floating pollutants, putrescent substances, sludge-forming suspended solids, dissolved organic substances and bacteria. The undissolved substances are separated in the mechanical cleaning of wastewater. Coarse contaminants are retained by bar screens, the grit is separated out in the grit chamber, the sludge is separated out in the clarification tank or sludge settling tank. Primary clarification tanks serve to remove settleable solids from the wastewater. The dissolved, putrescible organic substances that are still present after the mechanical cleaning of wastewater are degraded in the biological cleaning of wastewater by the bacteria located in the wastewater.

The method described at the start has already been prior art for years and is the most commonly used method for the biological cleaning of wastewater in sewage treatment plants. In said method, the mostly communal wastewater is cleared of organic contaminants, i.e., cleaned, to the greatest possible extent by the metabolic activity of aerobic chemoorganoheterotrophic microorganisms, the so-called activated sludge. The method starts after the removal or separation of the coarse fractions, which are dewatered, separated, digested and incinerated. For communal wastewaters, this method ranks among the classic intensive treatment methods. The advantage is the general usability and the good cleaning action for wastewaters for reducing the levels of suspended solids, the chemical oxygen demand (COD), the biochemical oxygen demand (BOD5) and the nitrogen compounds (N).

Plants based on the activated-sludge method can be operated either continuously, i.e., in continuous operation (conventional activated-sludge plant), or discontinuously (SBR plant). Furthermore, there are also additionally so-called membrane activated-sludge plants, in which a membrane is used to remove the cleaned water from the sludge. What is common to all variants is that the water-suspended bacteria mass or biomass, which is also referred to as activated sludge, assumes the biological cleaning of the wastewater. To this end, each plant has at least one activated-sludge tank, in which the wastewater is admixed with the activated sludge and thus intensively contacted with the activated sludge.

Activated sludge means the biomass formed in the activated-sludge tank in the aerobic biological cleaning of wastewater as a result of the degradation of the wastewater ingredients. It substantially consists of microorganisms, such as, for example, bacteria, fungi, protozoa, EPS (extracellular polymeric substances) and further constituents. Microscopic studies provide evidence that the activated sludge is "activated" by bacteria and protozoa. Therefore, it is also called activated sludge. When used technically in the activated-sludge method, the activated sludge is generally present in the form of activated-sludge flocs, which contain, besides living and dead biomass, adsorbed and embedded organic compounds and minerals.

In the activated-sludge method, the degradation of the harmful substances in the wastewater by the activated sludge is followed by a separation of said sludge from the cleaned water in the so-called secondary clarification unit. The majority of the removed sludge is recycled into the activated-sludge tank as return sludge or recirculation sludge. This ensures that the activated-sludge concentration in the activated-sludge tank can be maintained. The activated flocs present in the return sludge renew the cleaning power of the activated material. The non-recirculated, smaller volume stream of the activated sludge is called excess sludge. The excess sludge is thus the part of the activated sludge which is drawn off and pumped into the sludge treatment unit in order to keep the desired biomass concentration constant. This removed biomass growth is generally fed together with the primary sludge to the sludge digestion unit and lastly to the sludge dewatering unit.

In the activated sludge, there is the formation under certain boundary conditions, especially in the case of activated-sludge plants having a low sludge load (<0.2 kg BOD5/(kg DS d)), of filamentous bacteria (bulking sludge), which can prevent the settling process in the secondary clarification tank or, in the case of an SBR plant, in the activated-sludge tank and lead to the output of activated sludge and thus severely impair the effluent quality. Over 65% of all activated-sludge plants have a bulking-sludge problem from time to time. The settling properties of the sludge are the crucial parameter in the assessment of an activated-sludge plant.

The most common filamentous bacteria are bacteria of the type Microthrix parvicella, Nocardia, type 021 N and others. Owing to the filamentous structure, these bacteria prevent the settling of the sludge, resulting in an inadequate separation of sludge water.

In many cases, this problem is handled by nonspecific measures, such as, for example, the addition of precipitants based on aluminum to the activated-sludge tank. However, it is not possible in many cases to improve the settling properties to the desired extent. In addition, the addition of these chemicals additionally produces sludge which must be subsequently disposed of.

In the case, too, of activated-sludge steps under very high load, for example adsorption steps, also called A steps (sludge load>2 kg BOD5/(kg DS d)), the major problem is that of achieving an easily settleable sludge. The settleability of the activated sludge in the A step and, accordingly, the settling and the recycling to the activated-sludge step that is under high load are the major challenge in the assessment and in the operation of such a plant.

The settling properties of the activated sludge determine the size of the secondary clarification unit (settling tank or secondary clarification tank). The more poorly the activated sludge settles, the larger the size of the secondary clarification unit must be. The better the sludge settles, the smaller the secondary clarification unit can be, the higher the activated-sludge concentration in the activated-sludge tank can be and, accordingly, the smaller the size of the required volume of the activated-sludge tank and of the secondary clarification tank can be. The sludge settling properties are crucial to the size of the entire activated-sludge plant and have a crucial impact on the construction costs of the activated-sludge plant.

SUMMARY

In an embodiment, the present invention provides a method for the biological cleaning of wastewater in an activated-sludge plant comprising at least one activated-sludge tank, the method comprising: contacting, in the plant, the wastewater with activated sludge in the activated-sludge tank so as to clean the wastewater; and after the cleaning of the wastewater, separating, in the plant, the suspended activated sludge from the cleaned wastewater by sedimentation in a secondary clarification tank downstream of the activated-sludge tank or in the activated-sludge tank, wherein the activated sludge suspended in the wastewater is admixed with growth bodies in the activated-sludge tank in order to contact the growth bodies with the microorganisms present in the activated sludge and to bring about formation of a biofilm of microorganisms on the growth bodies, wherein the growth bodies comprising plastic or rubber have a higher density than the wastewater and the suspended activated sludge in order to bring about an increase in the settling rate of the activated sludge during the sedimentation in the secondary clarification tank or the activated-sludge tank, wherein an excess fraction of the sedimented activated sludge containing the covered growth bodies is discharged as excess sludge from the secondary clarification tank or the activated-sludge tank, whereas an other fraction of the sedimented activated sludge containing the covered growth bodies is either recycled as return sludge from the secondary clarification tank into the activated-sludge tank or remains in the activated-sludge tank, wherein the discharged excess sludge is fed to a separation device comprising a hydrocyclone in which the covered growth bodies are separated from the activated sludge, and wherein the growth bodies are recycled into the activated-sludge tank of the activated-sludge plant through an underflow of the hydrocyclone and the removed activated sludge escapes through an overflow of the hydrocyclone and is fed to a sludge treatment unit or disposed of.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the invention provides a method for the biological cleaning of wastewater, in which method the activated sludge suspended in the wastewater is admixed with growth bodies in the activated-sludge tank in order to contact the growth bodies with the microorganisms present in the activated sludge and to bring about the formation of a biofilm of microorganisms on the growth bodies and in which method the growth bodies consisting of plastic or rubber have a higher density than the wastewater and the suspended activated sludge in order to bring about an increase in the settling rate of the activated sludge during the sedimentation in the secondary clarification tank (conventional activated-sludge plant) or the activated-sludge tank (SBR plant), wherein an excess fraction of the sedimented activated sludge containing the covered growth bodies is discharged as excess sludge from the secondary clarification tank or the activated-sludge tank, whereas the other fraction of the sedimented activated sludge containing the covered growth bodies is either recycled as return sludge from the secondary clarification tank into the activated-sludge tank (conventional activated-sludge plant) or remains in the activated-sludge tank (SBR plant). This substantially improves the sludge settling properties, since the settling rate of the mixture of covered growth bodies and suspended activated sludge during the sedimentation is substantially higher than the settling rate of a suspended activated sludge having no growth bodies. The reasons therefor are the higher density of the growth bodies in comparison with the activated sludge, and the heavy growth bodies weighing down the sedimented sludge bed in the secondary clarification unit. The activated-sludge flocs suspended in the wastewater, which flocs actually have a slower settling rate owing to their lower density, are carried along with the more rapidly settling growth bodies during the sedimentation in the sludge bed which forms and have as a result the same high settling rate as the growth bodies.

Whereas sedimentation rates of 0.2-3 m/h are achieved in conventional activated-sludge plants without the addition of growth bodies, it is possible to increase the settling rate to 3-6 m/h by means of the method according to the invention. As a result, both the activated-sludge tank and the secondary clarification tank can be built substantially smaller, the result being that the construction costs of the activated-sludge plant can be substantially reduced overall. In the case of already existing activated-sludge plants, the method according to the invention can increase the performance, meaning that plant expansions can be avoided.

The method can be carried out in a conventional activated-sludge plant having an activated-sludge tank with continuous flow-through and a downstream settling tank or secondary clarification tank, or in an SBR plant (sequencing batch reactor) having an activated-sludge tank in which the processes take place one after another. Optionally, a preliminary clarification tank is upstream of the activated-sludge tank of the particular activated-sludge plant.

What is common to the microorganisms or microbial aggregates in the activated sludge, which occur as flocs, slimes or biofilms, is that they are embedded in a matrix of extracellular, polymeric substances (EPS), which matrix holds them together and binds them, where applicable, to surfaces or solid media. The microorganisms or microbial aggregates preferably settle at the interface between solid media and water. Here, the substrate supply is optimal owing to the high relative speed. The firm anchoring is followed by the phase of microbial accumulation, which is determined especially by the propagation of the bacteria. At the same time, more EPS is formed and the thickness of the biofilm on the surface of the solid body grows. The prerequisites for the growth on surfaces are thus easily conceivable—what must be present are rough interfaces, microbially utilizable nutrients and the microorganisms themselves.

The invention takes advantage of this effect or insight. The addition of growth bodies to the activated sludge or the mixture of wastewater and activated sludge provides the required interfaces for the growth of the EPS. The microbially utilizable nutrients for the microorganisms in the activated sludge are provided by the wastewater.

A particularly advantageous configuration of the present method is also accomplished by the discharged excess sludge being fed to a separation device in which the covered growth bodies are separated from the activated sludge, wherein the growth bodies are recycled into the activated-sludge tank of the activated-sludge plant and the removed activated sludge is fed to a sludge treatment unit or disposed of. This prevents a disposal or a loss of the growth bodies present in the excess sludge from the activated-sludge plant. Thus, the growth bodies present in the excess sludge are, just like the growth bodies present in the return sludge, recycled into the activated-sludge tank and continue to be available for the biological cleaning of wastewater in the activated-sludge tank. As a result, a one-off feed of the growth bodies into the activated-sludge tank is sufficient, since the growth bodies are entirely or completely recycled into the activated-sludge tank in a loop again and again.

In a particularly practical configuration with respect to the economic viability of the method according to the invention, the separation of the excess sludge is carried out in a hydrocyclone. By means of a hydrocyclone, also called cyclone separator, it is possible for the covered growth bodies present in the excess sludge to be separated in a particularly rapid and process-reliable manner from the activated sludge present in the excess sludge. Owing to the higher density of the growth bodies in comparison with the activated sludge, they escape through an underflow of the hydrocyclone and are recycled into the activated-sludge tank. By contrast, the activated sludge, which has a lower density, escapes from the overflow of the hydrocyclone and is then disposed of or fed to a sludge digestion unit.

Furthermore, it proves appropriate for the biofilm arranged on the growth bodies to be at least partly removed during the separation of the covered growth bodies from the activated sludge in the separation device. The thickness of the biofilm on the growth bodies increases over time. As the thickness of the biofilm increases, the substrate supply to and thus the activity of the bacteria settled at the bottom, or the bacteria which settled first of all on the growth bodies, become limited by diffusion. This problem is solved by removing at least the top or outer layers of the biofilm in the separation device. This distinctly reduces the thickness of the biofilm, meaning that it has a high activity or performance after the recycling into the activated-sludge tank.

In this case, it proves particularly advantageous, after the introduction of the excess sludge into the hydrocyclone, for the growth bodies having a higher density in comparison with the activated sludge to be separated on a wall surface of the hydrocyclone by means of the centrifugal, current and flow forces in the hydrocyclone, wherein the relative movement of the moving growth bodies and of the stationary wall surface of the hydrocyclone generates forces, more particularly abrasion forces or shear forces, by means of which the biofilm present on the growth bodies is at least partly removed from the growth body. The introduced forces lead to a shear-off or to an abrasion of the biofilm on the growth bodies, as a result of which the thickness of the biofilm on the surface of the growth bodies is considerably reduced. The sheared-off or rubbed-off bacteria of the biofilm are then disposed of together with the removed activated sludge. Preferably, a thin layer of the biofilm remains on the growth bodies, and so they can develop their full performance after the recycling into the activated-sludge tank. Otherwise, the growth bodies would have to be recolonized in the activated-sludge tank, and this would slow down the cleaning method and limit the performance of the activated-sludge plant. The removal of the biofilm from the growth bodies is also supported by the stationary wall surface of the hydrocyclone, especially the bottom conical section, having a roughened surface. Advantageously, the surface of the stationary wall surface has an average roughness between 50 and 200 μm, preferably between 95 and 105 μm, particularly preferably of 100 μm.

In this connection, it proves useful for a hydrocyclone to be used in which the introduced excess sludge is exposed to centrifugal forces from 50 to 160 times the acceleration due to gravity (g). Centrifugal forces in this order of magnitude and resulting high speeds ensure that, firstly, the growth bodies are separated from the activated sludge and, secondly, the forces are sufficiently high to reduce the thickness of the biofilm to the desired extent.

In an alternative configuration of the method, the separation of the excess sludge is carried out in a screen or a screening machine. In this case, the growth bodies removed from the activated sludge, from a screening residue, are recycled into the activated-sludge tank, whereas the excess activated sludge, from a screening pass-through, is fed to further sludge treatment or disposed of.

It proves appropriate for a screen or a screening machine to be used with a screen lining, the passage openings of which have a mesh size which is smaller than the growth bodies. Preferably, the passage openings have a mesh size between 0.01 and 10 mm. This ensures that the growth bodies remain in the screening residue and prevents the passage openings from closing or clogging owing to the activated sludge. In this connection, it has has proven practicable for the passage openings to have a uniform mesh size.

In an advantageous embodiment, the covered growth bodies present in the excess sludge are exposed to a shaking or vibrating movement during a screening process and, as a result, contact the screen lining such that forces act on the growth bodies, by means of which the biofilm on the growth bodies is at least partly removed. The acting or introduced forces lead to a shear-off or to an abrasion of the biofilm on the growth bodies, as a result of which the thickness of the biofilm is considerably reduced. The sheared-off or rubbed-off bacteria of the biofilm are then disposed of together with the activated sludge via the screening pass-through, whereas the growth bodies are recycled into the activated-sludge tank.

To ensure a high performance of the activated-sludge plant and a high settling rate of the activated sludge during the secondary clarification, it has proven particularly appropriate for growth bodies to be used which have a density (in accordance with DIN EN ISO 1183-1) between 1.05 kg/dm$^3$ and 3.0 kg/dm$^3$, preferably between 1.5 kg/dm$^3$ and 1.7 kg/dm$^3$. Growth bodies having a lower density would not achieve the desired settling rate during the sedimentation in the secondary clarification unit. Growth bodies having a higher density would already settle in the activated-sludge tank during the aerated biological cleaning phase of the wastewater, meaning that it would not be possible to ensure the performance of the activated-sludge plant.

Furthermore, it is appropriate to use growth bodies which have a size between 0.01 mm and 10 mm, preferably between 0.2 mm and 1.0 mm. In the case of smaller growth bodies, there is the risk that they cannot be separated in a process-reliable manner from the activated sludge in the separation device, especially in the hydrocyclone, the result being that the growth bodies cannot be completely recycled into the activated-sludge tank. In this case, it would then be necessary to continuously introduce new additional growth bodies into the activated-sludge tank. In the case of larger growth bodies, there is the risk that the separation device, especially the hydrocyclone, is damaged owing to the high speed in the hydrocyclone. In this case, what can also be expected is damage to the growth bodies which leads to a loss of material. The geometric shape of the granule-type growth bodies is not subject to any restrictions. Both regularly shaped and irregularly shaped three-dimensional bodies are conceivable. In this connection, the size of from 0.01 to 10 mm or from 0.2 to 1.0 mm concerns the dimension in the direction of the main extent of the body. Preferably, one surface of the growth bodies is roughened or has structures in order to support a settling of the microorganisms on the surface.

For reasons of process reliability in the method according to the invention, especially for reliable removal of the growth bodies in the hydrocyclone, it is appropriate for the growth bodies introduced into the activated-sludge tank to have a uniform size.

Furthermore, in order to avoid destruction of or damage to the growth bodies during the separation and/or damage to the separation device, especially the hydrocyclone, the growth bodies consist of an elastically deformable material. In this case, the growth bodies can consist of thermoplastic, especially PVDF (polyvinylidene fluoride), ECTFE (chlorotrifluoroethylene fluorocopolymer), ETFE (ethylene tetrafluoroethylene), FEP (fluoroethylene propylene), PFA (perfluoroalkoxy polymers), or of a synthetic rubber, especially EPDM (ethylene propylene diene rubber) or of a material based on elastic polyurethane binders.

Lastly, it proves particularly advantageous for the method according to the invention to be able to be carried out in activated-sludge plants which have a sludge load between 0.05 kg BOD5/(kg DS d) and 6 kg BOD5/(kg DS d). As a result, it is possible to ensure a high settling rate of the activated sludge both in the case of low sludge load (<0.2 kg BOD5/(kg DS d)) and in the case of activated-sludge steps under very high load (>2 kg BOD5/(kg DS d)). The sludge load is the ratio of the daily fed BOD5 cargo in the wastewater to the biomass present in the activated-sludge tank, wherein the biomass is determined as dry substance (DS), sometimes also as organic part of the DS [kg BOD5/(kg DS d)].

According to the invention, the growth bodies consist of a material which has a high viscoelasticity or the material has a high viscoelastic fraction. This is necessary in order, firstly, not to damage the machinery of the SBR plant or of the activated-sludge plant, such as, for example, pumps, stirrers and hydrocyclones, and, secondly, to allow the extensive shear-off of the biofilm from the growth bodies in the hydrocyclone. The goal here is to achieve an extensive, but incomplete, shear-off of the biofilm in each run by means of the hydrocyclone. In the case of a complete shear-off, the growth bodies would have to be recolonized after the recycling into the activated-sludge tank, and this would slow down the cleaning method overall and limit the performance of the activated-sludge plant or of the SBR plant. If there were to be no shear-off of the biofilm at all, the thickness of the biofilm on the growth bodies would continue to increase. As the thickness of the biofilm increases, the substrate supply to and thus the activity of the bacteria settled at the bottom, or the bacteria which settled first of all on the growth bodies, become limited by diffusion. Further along in the method sequence, this growing inert or anaerobic bacteria layer is merely a burden which does not contribute to the biological cleaning performance of the plant and can lead to plant operation problems.

Furthermore, it proves particularly advantageous when growth bodies are used, the surface of which has an average roughness between 2 μm and 20 μm, preferably of about 10 μm. This ensures a rapid ingrowth or adhesion of the bacteria and a rapid covering of the surface of the growth bodies by a biofilm. At the same time, such an average roughness effectively prevents an undesired complete removal or shear-off of the biofilm from the surface of the growth bodies in the hydrocyclone. Owing to the non-sheared-off thin layer of the biofilm, the growth bodies are immediately biologically active again after the recycling into the activated-sludge tank and contribute to improving the cleaning performance of the plant.

To prevent the growth bodies from being destroyed during the method sequence, especially during the passage through the machinery of the plant, such as, for example, the stirrers, the pumps and the hydrocyclones, and to ensure a practically unlimited resistance of the growth bodies in the wastewater, the growth bodies must consist of a material optimized with respect to toughness, hardness, strength, especially tensile strength and elasticity.

With respect to toughness, it has proven appropriate for growth bodies composed of a material having an elongation at break (DIN 53504) of more than 700% to be used. Elongation at break, also called elongation at fracture, is a characteristic value of a material that indicates the ratio of the change in length to the starting length after the breakage of the test specimen. It expresses the capacity of a material to withstand changes in shape without rupturing.

With regard to hardness (DIN ISO 7619-1), it has proven advantageous for growth bodies composed of a material having a Shore A hardness between 50 and 70, preferably between 55 and 65, to be used. Shore hardness is understood to mean the resistance of a rubber sample to the penetration of a cone-shaped body of particular dimensions under a defined compression force. Depending on the design of the measurement body, a distinction is made between Shore A for softer elastomer mixtures and Shore D for harder elastomer mixtures.

Furthermore, it has become apparent with respect to strength or tensile strength that growth bodies composed of a material having a tensile strength (DIN 53504) of more than 5 MPa are used. The tensile strength is a material property which indicates the maximum mechanical tensile stress which the material withstands before it breaks/ruptures. Commonly used units of measurement are MPa (megapascal) or $N/mm^2$.

With respect to elasticity, it has proven appropriate for growth bodies composed of a material having a compression set below 50% to be used. Compression set (CS, 72 h@RT, DIN ISO 815-1) is a measure of how elastomers behave in the case of long-term, constant compression and subsequent release. A CS of 0% means that the body has fully reached its original thickness again (impossible in reality); a CS of 100% means that the body has completely deformed during the test and shows no recovery.

Growth bodies having the aforementioned material properties have, together with the biofilm, a settling rate of 3 to 6 m/h. To this end, the growth bodies should have a density of 1.5 to 1.7 kg/dm$^3$, particularly preferably of 1.62 kg/dm$^3$. At the same time, the size or the particle size of the growth bodies must be in the range from 0.2 to 1.0 mm.

According to the invention, the material of the growth bodies consists of elastomer materials and polymer blend and also various additives.

Elastomer materials fundamentally consist of a polymer, for example of rubber, or a polymer blend, a blend of various rubbers, for example natural rubber and styrene-butadiene rubber, and various auxiliaries and additives and also fillers or reinforcing materials. A major property of the elastomers is the rubber elasticity (entropic elasticity), which can be attributed to the wide-meshed, irreversible crosslinking of the rubber molecules that occurs during the vulcanization. Compared to semicrystalline plastics that are used in practice, elastomer materials have low modulus values, can be strongly deformed using relatively low forces and largely reassume their original shape after the release.

The aforementioned material properties are fulfilled by a vulcanized (crosslinked) rubber mixture which is produced from the raw material EPDM rubber (ethylene propylene diene rubber) and additives such as mineral fillers (chalk), paraffin oil, processing aids and sulfur-based crosslinkers, which form a double molecular bonding bridge. In addition, the material is free of phthalates (plasticizers) and contains little elutable zinc and other heavy metals and is, as a result, safely usable even in water-protection areas.

Figure 1:
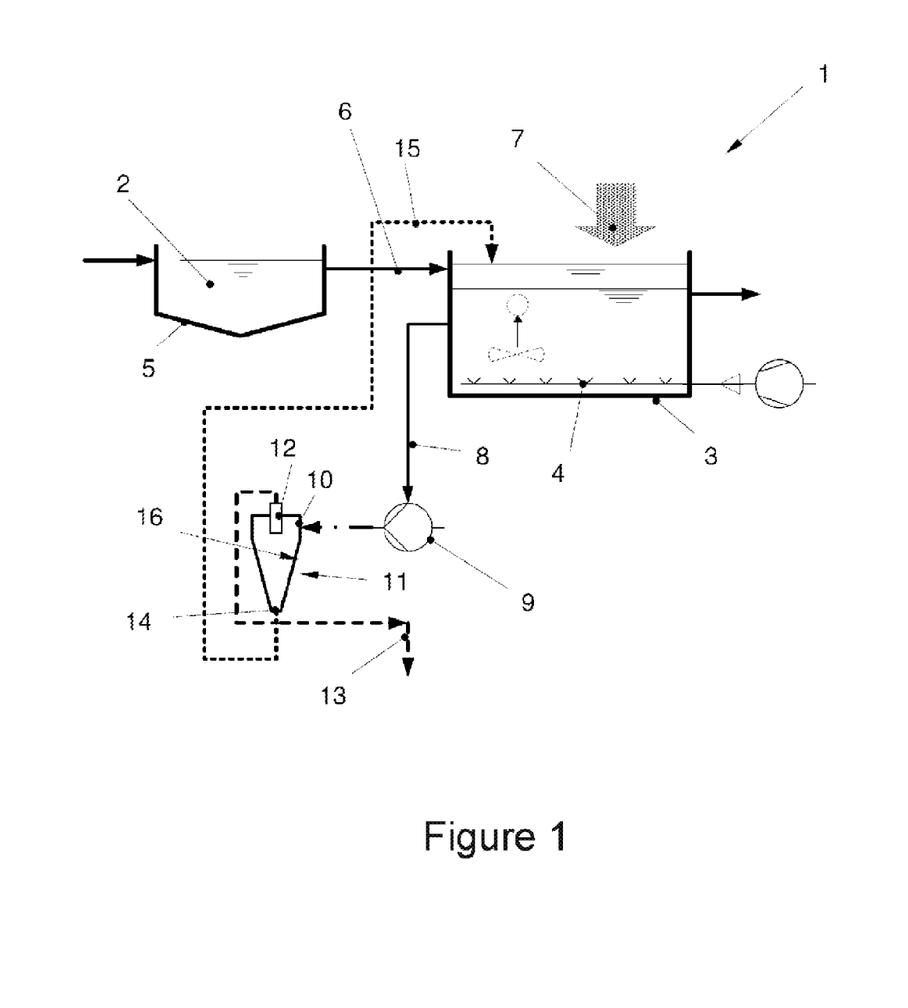
FIG. 1 a schematic diagram of an SBR plant for the biological cleaning of wastewater.

FIG. 1 shows an activated-sludge plant 1, in the form of an SBR plant, for the biological cleaning of wastewater 2 in the activated-sludge method. The SBR plant has an activated-sludge tank 3 having an air vent 4 and an upstream primary clarification tank 5.

The wastewater 2 situated in the primary clarification tank 5 is introduced into the activated-sludge tank 3 (arrow 6) and intensively contacted with the activated sludge likewise situated in the activated-sludge tank 3. In addition, growth bodies composed of plastic or rubber are introduced into the activated-sludge tank 3, this being depicted by direction arrow 7. During the aeration of the mixture of wastewater 2, suspended activated sludge and growth bodies that is arranged in the activated-sludge tank 3, the biological cleaning of the wastewater 2 in the activated-sludge method is effected. During the biological cleaning, the microorganisms or bacteria present in the activated sludge settle at least in part on the surfaces of the growth bodies, giving rise thereon to a biofilm of microorganisms.

After the biological cleaning step, the bacteria mass or the activated sludge must be separated from the cleaned wastewater 2, and so the wastewater 2, which is then virtually free of solids, can be introduced into a discharge system, which is not depicted in FIG. 1. The separation of activated sludge and wastewater 2 is done by sedimentation, i.e., by a settling process of the activated sludge in the activated-sludge tank 3 of the SBR plant during a sedimentation and decanting phase. Owing to the covered growth bodies present in the suspended activated sludge, the settling rate of the mixture of activated sludge and covered growth bodies is very much higher than the settling or sedimentation rate of a suspended activated sludge without the growth bodies. This results from the higher density of the growth bodies in comparison with the suspended activated sludge and from the heavy growth bodies weighing down the sedimented sludge bed. The suspended activated sludge or the activated-sludge flocs are carried along by the more rapidly sedimenting covered growth bodies.

Following the sedimentation, an excess fraction of the activated sludge containing the covered growth bodies, which fraction arises during the biological cleaning step, is drawn off from the activated-sludge tank 3 as excess sludge (arrow 8) and introduced, via an inlet 10, into a separation device in the form of a hydrocyclone 11 by means of a pump 9. In the hydrocyclone 11, the covered growth bodies are separated from the excess activated sludge. The activated sludge, which is lighter in comparison with the growth bodies, is discharged from the hydrocyclone 11 via an overflow 12 and disposed of or fed to a sludge treatment unit (arrow 13). The heavier growth bodies, which have a higher density, are discharged from the hydrocyclone 11 through an underflow 14 and recycled into the activated-sludge tank 3 of the activated-sludge plant 1 (arrow 15).

During the separation of the growth bodies from the activated sludge in the hydrocyclone 11, the biofilm arranged on the growth bodies is at least partly removed or reduced in terms of its thickness. A relative movement between the rapidly moving growth bodies and a stationary wall surface 16 of the hydrocyclone 11 generates forces, more particularly shear forces and/or abrasion forces, and introduces them into the growth bodies or the biofilm arranged thereon. As a result, the biofilm is partly removed and reduced in terms of its thickness.

Figure 2:
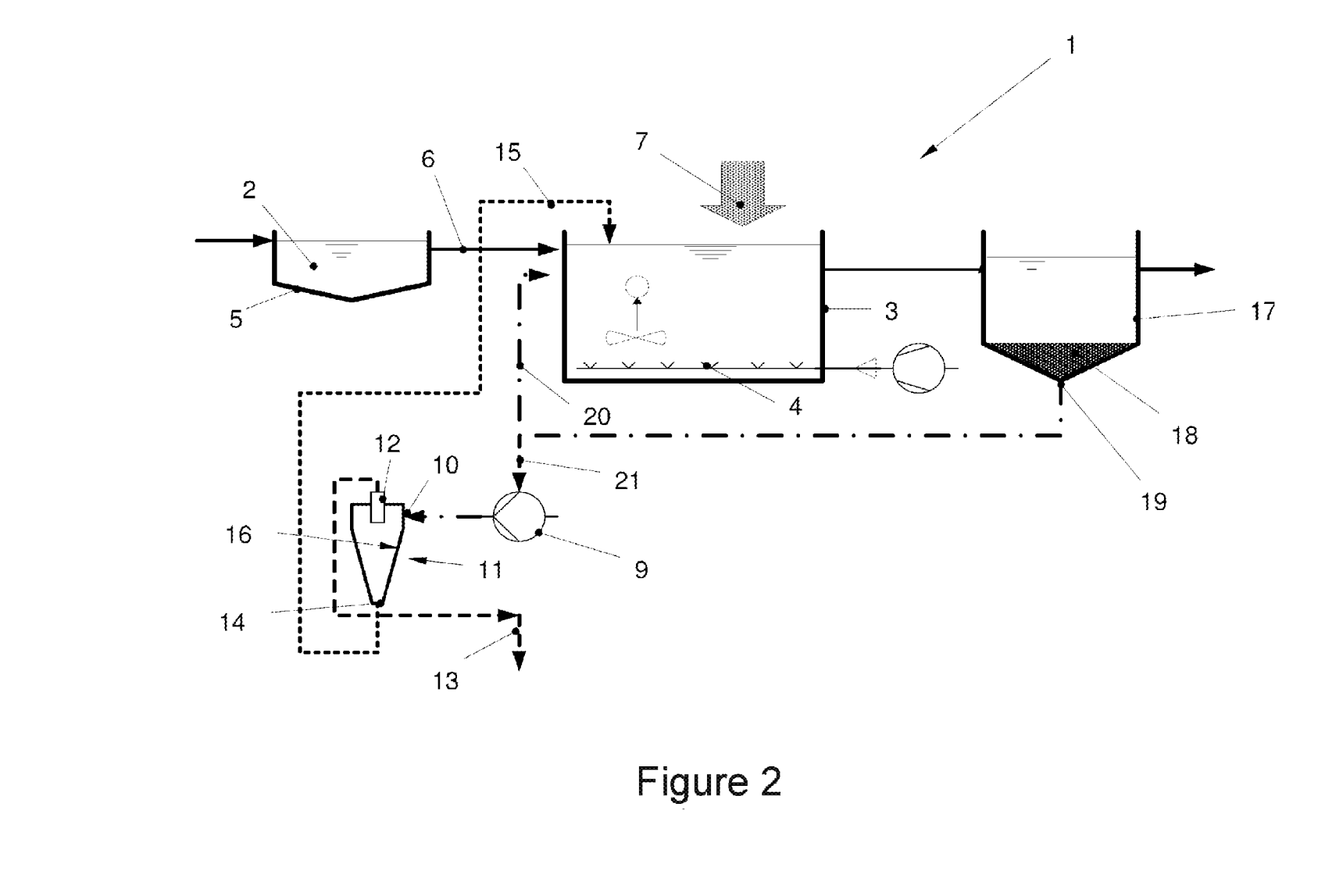
FIG. 2 a schematic diagram of a conventional activated-sludge plant for the biological cleaning of wastewater.

FIG. 2 shows a conventional activated-sludge plant 1 for the biological cleaning of wastewater 2, having an activated-sludge tank 3 with continuous flow-through. The activated-sludge plant 1 has, besides activated-sludge tank 3 and the upstream primary clarification tank 5, a secondary clarification tank 17 or settling tank which is downstream of the activated-sludge tank 3.

The wastewater 2 is introduced from the primary clarification tank 5 into the activated-sludge tank 3, in which the activated sludge is also situated (arrow 6). The suspended activated sludge arranged in the activated-sludge tank 3 is then admixed with growth bodies composed of plastic or rubber and aerated by means of the air vent 4, and so the biological cleaning of the wastewater 2 in the activated-sludge method takes place in the activated-sludge tank 3. What occurs here is a colonization of the growth bodies by a biofilm of microorganisms or bacteria present in the activated sludge.

After the biological cleaning step in the activated-sludge tank 3, the mixture of cleaned wastewater 2, suspended activated sludge and covered growth bodies is conducted into the secondary clarification tank 17, in which the covered growth bodies and the activated sludge are separated from the cleaned wastewater 2 by sedimentation. Owing to the covered growth bodies present in the suspended activated sludge, the settling rate of the activated sludge is very much higher than the sedimentation rate of the suspended activated sludge without the growth bodies. This results from the higher density of the growth bodies in comparison with the suspended activated sludge and from the heavy growth bodies weighing down the sedimented sludge bed 18 in the secondary clarification tank 17. The suspended activated sludge is carried along by the more rapidly settling covered growth bodies. Then, the sedimented activated sludge containing the covered growth bodies is discharged from the secondary clarification tank 17 through an outlet 19 and some of it is recycled as return sludge into the activated-sludge tank 3 (arrow 20). An excess fraction of the activated sludge containing the covered growth bodies (arrow 21) is then introduced as excess sludge into the separation device in the form of a hydrocyclone 11 by means of a pump 9.

In the hydrocyclone 11, the covered growth bodies are then separated from the excess activated sludge. The activated sludge, which is lighter in comparison with the growth bodies, is discharged from the hydrocyclone 11 via the overflow 12 and disposed of or fed to a sludge treatment unit (arrow 13). The growth bodies, which have a higher density and are heavier as a result, are discharged from the hydrocyclone 11 through the underflow 14 and recycled into the activated-sludge tank 3 of the activated-sludge plant 1 (arrow 15).

Figure 3:
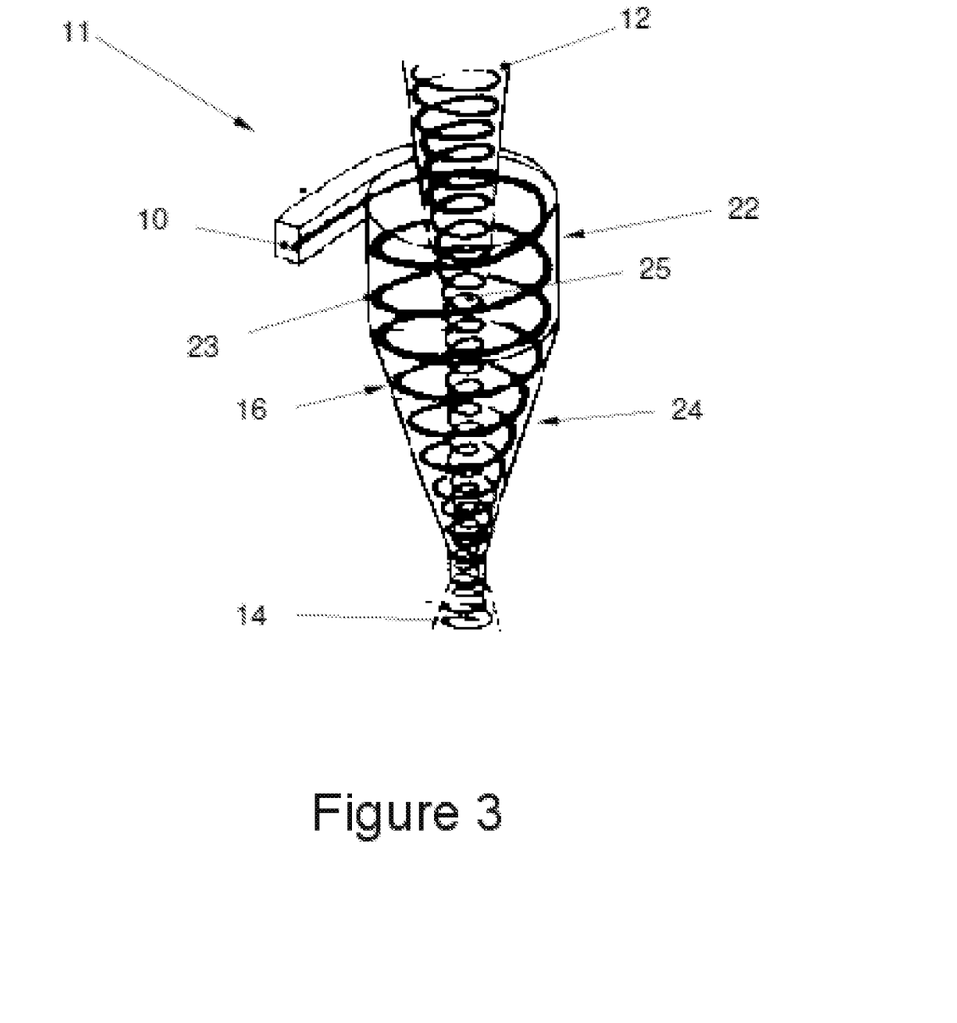
FIG. 3 a schematic diagram of a hydrocyclone depicted in FIGS. 1 and 2.

FIG. 3 illustrates the flow conditions in the hydrocyclone 11 depicted in FIGS. 1 and 2. The excess sludge consisting of activated sludge and covered growth bodies is introduced in a tangential manner via the inlet 10 into a cylindrical segment 22 of the hydrocyclone 11. As a result, the excess sludge is forced onto a circular path and flows downward in a downwardly directed outer vortex 23. A tapering in a conical segment 24 of the hydrocyclone 11 leads to an inward displacement of volume and to a back-up in the bottom region of the cone, leading to the formation of an inner, upwardly directed inner vortex 25. The covered growth bodies, which have a higher density, are separated on the wall surface 16 of the hydrocyclone 11 and discharged from the hydrocyclone 11 through the underflow 14, whereas the activated sludge, which has a lower density, is discharged from the hydrocyclone 11 through the overflow 12. In the hydrocyclone depicted, the excess sludge is exposed to centrifugal forces from 50 to 160 times the acceleration due to gravity g. The relative movement between the excess sludge, which is forced onto the circular path and moves rapidly, and the stationary wall surface 16 of the hydrocyclone 11 introduces forces into the growth bodies present in the sludge, which forces remove the biofilm arranged on the growth bodies or reduce it in thickness.

EXAMPLE

In a two-line activated-sludge plant for the biological cleaning of wastewater in the activated-sludge method, each of the lines has in each case a sludge index of about 300 ml/g. A sludge index of 150 ml/g is considered by experts to be a poorly settling sludge, a bulking sludge.

After the addition of growth bodies composed of EPDM (ethylene propylene diene rubber) to the activated-sludge tank of one of the two lines and the performance of the method according to the invention, the sludge settling properties of said line improved steadily. Eight weeks after incorporation of this mode of operation, the line with the introduced growth bodies has a sludge index of about 80 ml/g, reaches settling rates of 4-5 m/h and run-off values of 2-5 mg of suspended material/l and is subsequently fixed at this level. By contrast, the line without growth bodies has, after eight weeks, a sludge index of over 300 ml/g, a settling rate of 0.3-0.5 m/h and run-off values of over 20 mg of suspended material/l.

The invention claimed is:

1. A method for the biological cleaning of wastewater in an activated-sludge plant comprising at least one activated-sludge tank, the method comprising:
  contacting, in the plant, the wastewater with activated sludge in the activated-sludge tank so as to clean the wastewater; and
  after the cleaning of the wastewater, separating, in the plant, the suspended activated sludge from the cleaned wastewater by sedimentation in a secondary clarification tank downstream of the activated-sludge tank or in the activated-sludge tank,
  wherein the activated sludge suspended in the wastewater is admixed with growth bodies in the activated-sludge tank in order to contact the growth bodies with the microorganisms present in the activated sludge and to bring about formation of a biofilm of microorganisms on the growth bodies,
  wherein the growth bodies, which comprise an elastically deformable material of plastic or rubber, have a higher density than the wastewater and the suspended activated sludge in order to bring about an increase in the settling rate of the activated sludge during the sedimentation in the secondary clarification tank or the activated-sludge tank,
  wherein an excess fraction of the sedimented activated sludge containing the covered growth bodies is discharged as excess sludge from the secondary clarification tank or the activated-sludge tank, whereas an other fraction of the sedimented activated sludge containing the covered growth bodies is either recycled as return sludge from the secondary clarification tank into the activated-sludge tank or remains in the activated-sludge tank,
  wherein the discharged excess sludge is fed to a separation device comprising a hydrocyclone in which the covered growth bodies are separated from the activated sludge,
  wherein the growth bodies are recycled into the activated-sludge tank of the activated-sludge plant through an underflow of the hydrocyclone and the removed activated sludge escapes through an overflow of the hydrocyclone and is fed to a sludge treatment unit or disposed of,
  wherein, after the introduction of the excess sludge into the hydrocyclone, the growth bodies having a higher density in comparison with the activated sludge are separated on a wall surface of the hydrocyclone by current and flow forces in the hydrocyclone, and
  wherein relative movement of the moving growth bodies and of the stationary wall surface of the hydrocyclone generates forces by which the biofilm present on the growth bodies is at least partly removed from the growth body.

2. The method as claimed in claim 1, wherein the biofilm arranged on the growth bodies is at least partly removed during the separation of the covered growth bodies from the activated sludge in the separation device.

3. The method as claimed in claim 1, wherein the hydrocyclone exposes the introduced excess sludge to centrifugal forces from 50 to 160 times acceleration due to gravity.

4. The method as claimed in claim 1, wherein growth bodies are used which have a density between 1.05 kg/dm$^3$ and 3.0 kg/dm$^3$.

5. The method as claimed in claim 1, wherein the growth bodies are used which have a size between 0.01 mm and 10 mm.

6. The method as claimed in claim 1, wherein the growth bodies introduced into the activated-sludge tank have a uniform size.

7. The method as claimed in claim 1, wherein the growth bodies comprise a material which has a high viscoelasticity or a high viscoelastic fraction.

8. The method as claimed in claim 1, wherein a surface of the growth bodies that are used has an average roughness between 2 μm and 20 μm.

9. The method as claimed in claim 1, wherein growth bodies comprise a material having an elongation at break of more than 700%.

10. The method as claimed in claim 1, wherein growth bodies comprise a material having a Shore A hardness between 50 and 70.

11. The method as claimed in claim 1, wherein growth bodies comprise a material having a tensile strength of more than 5 MPa.

12. The method as claimed in claim 1, wherein growth bodies comprise a material having a compression set below 50%.

13. The method as claimed in claim 1, wherein a material of the growth bodies comprises elastomer material and polymer blend and at least one additive.

14. The method as claimed in claim 1, wherein the forces comprise abrasion forces or shear forces.

15. The method as claimed in claim 4, wherein the density is between 1.5 kg/dm$^3$ and 1.7 kg/dm$^3$.

16. The method as claimed in claim 5, wherein the size is between 0.2 mm and 1.0 mm.

17. The method as claimed in claim 8, wherein the average roughness is 10 μm.

18. The method as claimed in claim 10, wherein the Shore A hardness is between 55 and 65.

* * * * *